United States Patent Office 3,769,284
Patented Oct. 30, 1973

3,769,284
2,4-DISUBSTITUTED 3-AMINO-CYCLOHEXENONES
James Roger Hargreaves, Sale, Raymond Jeffrey, Warrington, and Peter William Hickmott, Furness Vale, England, assignors to Ciba-Geigy Corporation, Ardsley, N.Y.
No Drawing. Filed Sept. 11, 1969, Ser. No. 857,200
Claims priority, application Great Britain, Sept. 17, 1968, 44,053/68
Int. Cl. C07d 87/34
U.S. Cl. 260—247.7 K    3 Claims

ABSTRACT OF THE DISCLOSURE 2,4-disubstituted 3-amino-cyclohex-2-en-1-ones are described which bear in 2- and 4-position aralkyl or aryl groups or an alkylene bridge linked to both positions. These compounds and their salts are light-stabilizers for light-sensitive materials, e.g. thermoplastic vinyl and vinylidene polymers and the like. A typical compound has the formula

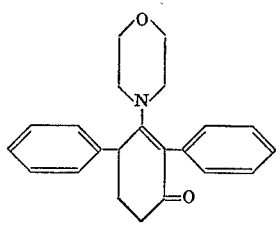

DESCRIPTION OF THE INVENTION

The present invention relates to novel chemical compounds and in particular to 2,4-disubstituted cyclohex-2-en-1-ones.

According to the present invention there is provided a compound having the formula:

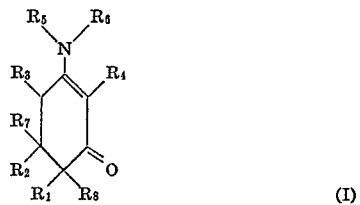

or a salt thereof, wherein $R_1$, $R_2$, $R_7$ and $R_8$ may be hydrogen, alkyl, substituted alkyl, halogen or cyano, $R_3$ and $R_4$ may be the same or different and may be aralkyl or aryl or wherein $R_3+R_4$ is an alkylene chain containing from 5 to 12 carbon atoms, and wherein $R_5$ and $R_6$ are the same or different and may be a straight-, branched- or cyclic alkyl radical, a substituted or unsubstituted aryl or aralkyl radical, or wherein $R_5+R_6$ is an alkylene chain containing from 4 to 6 carbon atoms uninterrupted or interrupted by an oxygen atom or by a nitrogen atom substituted by a 2,4 - diphenyl - cyclohex-2-en-1-one-3-yl grouping.

Although one or more of the substituents $R_1$, $R_2$, $R_7$ and $R_8$ may advantageously be hydrogen, where the substituents $R_1$, $R_2$, $R_7$ and $R_8$ are straight-chain alkyl radicals the alkyl radical preferably contains from 1 to 5 carbon atoms, and is desirably methyl. Where the substituents $R_3$ and $R_4$ are aryl groups they may be, for instance, phenyl groups substituted by hydroxy or alkoxy groups or chlorine or bromine atoms, but they are preferably unsubstituted phenyl groups. Where $R_3+R_4$ is an alkylene chain, the alkylene chain preferably contains between 8 and 10 carbon atoms. Where $R_5$ and $R_6$ are straight- or branched-chain alkyl groups, the alkyl radical preferably contains from 2 to 5 carbon atoms. Where $R_5+R_6$ is an uninterrupted alkylene chain, this chain preferably contains either 4 or 5 carbon atoms. Where $R_5+R_6$ is an alkylene chain interrupted by an oxygen atom, this grouping preferably contains 4 or 5 carbon atoms, the grouping $$-R_5-N-R_6$$

thus formed being, for instance, morpholino.

The salts of the compound having Formula I may be, for instance, the chloride, sulphate or the perchlorate.

Examples of the novel compounds of the present invention are 2,4-diphenyl-3-N-morpholinocyclohex-2-en-1-one,
2,4-diphenyl-3-N-pyrrolidinocyclohex-2-en-1-one,
2,4-diphenyl-5-methyl-3-N-morpholinocyclohex-2-en-1-one,
2,4-diphenyl-6-methyl-3-N-morpholinocyclohex-2-en-1-one,
15-N-morpholino- or 15-N-pyrrolidino-$\Delta^{11,15}$-bicyclo (9,3,1) pentadecan-12-one,
N,N'-(2,4-diphenylcyclohex-2-ene-1-one-3-yl) piperazine, and
18-N-morpholino-$\Delta^{14,18}$-bicyclo (12,3,1) octadecan-15-one.

The present invention also provides a process for the production of compounds having the Formula I which comprises reacting a compound having the formula:

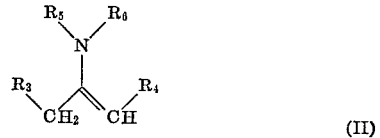
(II)

with an acid chloride having the formula:

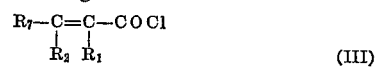
(III)

wherein the substituents $R_1$, $R_2$, $R_3$, $R_4$, $R_5$, $R_6$ and $R_7$ are as hereinbefore defined.

The compound having the Formula II may, if desired, be prepared by refluxing a ketone having the formula:

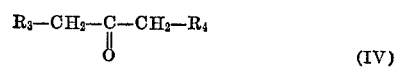
(IV)

in benzene or toluene with a secondary amine having the formula:

$$R_5NHR_6 \quad (V)$$

in the presence of p-toluene sulphonic acid. The water formed during the reaction may be removed either with a water separator or by passing the vapours through a molecular sieve. On completion of the reaction the solvents may be removed under vacuo and the products either distilled or recrystallised.

The compound having the Formula III may, if desired, be prepared by treating the corresponding acid with benzoyl chloride (in the case of acrylic acid) or thionyl chloride (in the case of methacrylic acid and crotonic acid). The acid chlorides distilled carefully from hydroquinone and stored over hydroquinone.

The compounds are preferably refluxed in the presence of an organic solvent which is inert under the conditions of the reaction, for example, benzene, toluene, dioxane, tetrahydrofuran, diethyl ether, acetone or acetonitrile. The time during which the mixture is refluxed may vary widely, but is preferably within 1 and 24 hours. During the reaction hydrogen chloride may be evolved, and after cooling, the solid may be filtered off and then washed with dilute alkali, for instance dilute sodium hydroxide or dilute sodium bicarbonate. If desired after cooling the solution may be evaporated in vacuo. The product may then be purified by recrystallisation.

Alternatively, the hydrogen chloride may, if desired, be removed by addition of an organic base, for instance pyridine or triethylamine to the refluxing suspension. The product may then be isolated, for example, by filtering off the precipitated base hydrochloride and evaporation of the filtrate.

Examples of the compounds of Formula II which may be used in the process of the invention are 1,3-diphenyl-2-N-morpholinoprop-1-ene,
2-N-pyrrolidino-1,3-diphenylprop-1-ene,
1,3-diphenyl-2-dimethyl-aminoprop-1-ene,
1,3-diphenyl-2-(N-methylcyclohexylamino) prop-1-ene, and
1-N-morpholino- or 1-N-pyrrolidino cyclododecene.

Examples of the compounds of Formula III which may be used in the process of the invention are acryloyl chloride, methacryloyl chloride, crotonyl chloride, α- or β-chloroacryloyl chloride, α- or β-methylcrotonoyl chloride, α- or β-cyanoacryloyl chloride and α- or β-cyanocrotonoyl chloride.

The salts of the compounds having the Formula I may be prepared, for instance, by reacting a compound having the Formula I with the appropriate acid in a solvent which is inert under the conditions of the reaction. Acids which may be used are, for instance, sulphuric acid, perchloric acid and especially hydrochloric acid.

The compounds of the present invention are extremely useful as ultra-violet light absorbers and may be incorporated into a wide variety of organic materials susceptible to degradation in the presence of light.

Such materials include thermoplastic vinyl and vinylidene polymers, cellulose esters and ethers, linear fibreforming polyesters, polyamides, polyurethanes and polyester resins. Particularly preferred materials are polyolefines, for instance, polyethylene and polypropylene.

The present invention therefore provides, as a third aspect a composition comprising a light sensitive organic material and a compound having the Formula I in an amount sufficient to improve the light-stability.

Effective stabilization is achieved by incorporating into the light sensitive organic material an amount in the range of from 0.01% to 1% by weight of the compound having the Formula I based on the weight of light sensitive organic material.

Up to the present time enamino-ketones have been found to be extremely unstable to hydrolysis, but we have surprisingly found that the enamino-ketones having the Formula I are unexpectedly resistant to neutral, basic and acidic hydrolysis.

The following examples further illustrate the present invention. Parts by weight shown therein bear the same relation to parts by volume as do kilograms to litres. Percentages are expressed by weight unless otherwise stated.

EXAMPLE 1

4.52 parts of acryloyl chloride in 50 parts of dry benzene were added with stirring to 13.97 parts of 2-N-morpholino-1,3-diphenylprop-1-ene in 150 parts of dry benzene at the boil over a period of 65 minutes. The intermediate first formed as a white solid, changing slowly to an oil and finally to a pale cream solid. The second change was accompanied by the evolution of hydrogen chloride. The suspension was refluxed for 17 hours and then cooled and the solid filtered off. The solid was slurried with 100 parts of water and sodium bicarbonate was added until pH 8. The product was then filtered off and when recrystallized from chloroform, 12.8 parts of 2,4-diphenyl-3-N-morpholino-cyclohex-2-en-1-one as white plates having a melting point of 212° to 213° C. were obtained. The yield was 77% and the analysis was as follows:

Calculated ($C_{22}H_{23}NO_2$) (percent): carbon, 79.3; hydrogen, 6.95; nitrogen, 4.2. Found (percent): carbon, 79.2; hydrogen, 6.9; nitrogen, 4.4.

The ultra-violet data were as follows:

$$\lambda_{max.}^{EtOH} \ 324 \ m\mu \ (\epsilon = 19,600)$$

EXAMPLE 2

2.26 parts of acryloyl chloride in 50 parts of dry benzene were added with stirring to 6.57 parts of 2-N-pyrrolidino-1,3-diphenylprop-1-ene in 100 parts of dry benzene at the boil over 45 minutes. The mixture was stirred for a further 4 hours during which time hydrogen chloride was evolved. After cooling, the pale pink suspension was filtered and the solid was suspended in water and saturated sodium bicarbonate added until pH 8. The solid was filtered off and when recrystallised from ethyl acetate, 4.4 parts of 2,4-diphenyl-3-N-pyrrolidinocyclohex-2-en-1-one as pale pink needles having a melting point of 140° to 141° C. were obtained. The yield was 56% and the analysis was as follows:

Calculated ($C_{22}H_{23}NO$) (percent): carbon, 83.25; hydrogen, 7.3; nitrogen, 4.4. Found (percent): carbon, 83.4; hydrogen, 7.1; nitrogen, 4.35.

The ultra-violet data were as follows:

$$\lambda_{max.}^{EtOH} \ 318 \ m\mu \ (\epsilon = 27,000)$$

EXAMPLE 3

1.87 parts of methacrylo chloride in 40 parts of dry benzene were added with stirring to 5 parts of 2-N-morpholino-1,3-diphenylprop-1-ene in 60 parts of dry benzene at the boil over 30 minutes. The mixture was refluxed for 12 hours during which time the initially formed solid slowly dissolved accompanied by the evolution of hydrogen chloride. After cooling, the red solution was evaporated in vacuo to give a red oil which was treated with petroleum. 4.5 parts of 6-methyl-2,4-diphenyl-3-N-morpholinocyclohex-2-en-1-one as white needles having a melting point of 142° to 143° C. were obtained when recrystallised from a benzene-chloroform mixture. The yield was 72% and the analysis was as follows:

Calculated ($C_{23}H_{25}NO_2$) (percent): carbon, 79.5; hydrogen, 7.25; nitrogen, 4.0. Found (percent): carbon, 79.7; hydrogen, 7.4; nitrogen, 4.25.

The ultra-violet data were as follows:

$$\lambda_{max.}^{EtOH} \ 324 \ m\mu \ (\epsilon = 18,200)$$

EXAMPLE 4

1.87 parts of crotonyl chloride in 40 parts of dry benzene were added with stirring to 5 parts of 2-N-morpholino-1,3-diphenylprop-1-ene in 60 parts of dry benzene at the boil over 1 hour. The mixture was refluxed for 20 hours during which time the initially formed solid slowly dissolved along with the evolution of hydrogen chloride. After cooling, the black solution was evaporated under vacuo to give a thick black residue, which after repeated trituration with petroleum gave 2.5 parts of a semi-solid. This solid was passed through a silica column eluting with a mixture of benzene and ethanol in the ratio of 9 parts benzene to 1 part of ethanol to give 1.8 parts of 5-methyl-2,4-diphenyl-3-N-morpholinocyclohex-2-en-1-one as fawn needles. The melting point was 135° to 137° C., the yield was 35% and the analysis was as follows:

Calculated ($C_{23}H_{25}NO_2$) (percent): carbon, 79.5; hydrogen, 7.25; nitrogen, 4.0. Found (percent): carbon, 79.5; hydrogen, 7.3; nitrogen, 4.25.

The ultra-violet data were as follows:

$$\lambda_{max.}^{EtOH} \ 325 \ m\mu \ (\epsilon = 18,500)$$

EXAMPLE 5

2.49 parts of acryloyl chloride in 50 parts of dry benzene were added with stirring to 6.91 parts of 1-N-morpholino-cyclododecene in 150 parts of dry benzene at the boil over 1 hour and refluxed for 20 hours. The intermediate initially formed as an oil was converted slowly to a solid during the reaction, filtered off after cooling and dried to give 7.8 parts of solid. The dry intermediate was dissolved in 100 parts of water and 2 N sodium hydroxide was added until the aqueous suspension was pH 8. The aqueous suspension was ether extracted to give 6.9 parts of 15-N-morpholino-$\Delta^{11,15}$-bicyclo (9,3,1) pentadecan-12-one as white needles having a melting point of 127° to 128° C. when recrystallized from toluene. The yield was 82% and the analysis was as follows:

Calculated ($C_{19}H_{31}NO_2$) (percent): carbon, 74.7; hydrogen, 10.2; nitrogen, 4.6. Found (percent): carbon. 74.4; hydrogen, 10.2; nitrogen, 4.8.

The ultraviolet data were as follows:

$\lambda_{max.}^{MeOH}$ 341 m$\mu$ ($\epsilon$=28,200)

EXAMPLE 6

2.72 parts of methacryloyl chloride in 50 parts of dry benzene were added with stirring to 6.54 parts of 1-N-morpholinocyclododecene in 50 parts of dry benzene at the boil over 1 hour. The reaction mixture was refluxed for 20 hours, cooled and the solid intermediate filtered off. The solid was dissolved in water and 2 N sodium hydroxide added until pH 8. The suspension was scratched and the solid thus formed was filtered off to give 3.5 parts of 13-methyl - 15 - N - morpholino-$\Delta^{11,15}$-bicyclo (9,3,1) pentadecan-12-one as pale pink plates having a melting point of 132° to 133° C. when recrystallised from benzene. The yield was 44% and the analysis was as follows:

Calculated ($C_{20}H_{33}NO_2$) (percent): carbon, 75.2; hydrogen, 10.4; nitrogen, 4.4. Found (percent): carbon, 75.45; hydrogen, 10.2; nitrogen, 4.3.

The ultraviolet data were as follows:

$\lambda_{max.}^{EtOH}$ 339 m$\mu$ ($\epsilon$=20,000)

EXAMPLE 7

1.01 parts of acryloyl chloride in 25 parts of dry benzene were added with stirring to 3.0 parts of 1-N-pyrrolidino cyclododecene in 50 parts of dry benzene at the boil over 30 minutes. The mixture was refluxed for 8 hours, cooled to room temperature and 3.25 parts of solid were collected. The solid was dissolved in water and 2 N sodium hydroxide was added slowly until pH 8.

The resultant mixture was ether extracted and 2.0 parts of 15-N-pyrrolidino-$\Delta^{11,15}$-bicyclo (9,3,1) pentadecan-12-one were obtained as pale yellow needles having a melting point of 98° to 100° C. The yield was 63% and the analysis was as follows:

Calculated ($C_{19}H_{31}NO$) (percent): carbon, 78.9; hydrogen, 10.8; nitrogen, 4.8. Found (percent): carbon, 79.1; hydrogen, 10.7; nitrogen, 5.1.

EXAMPLE 8

To 0.15 part of 2,4-diphenyl-3-N-morpholinocyclohex-2-en-1-one dissolved in 2 parts of chloroform and 2 parts of ethanol was added 0.2 part of 70% perchloric acid. After two weeks a red oil formed which gave a white solid on addition of ethanol, which was filtered off to give 2,4-diphenyl-3-morpholinocyclohex-2-en-1-one perchlorate as fine white needles, having a melting point of 205° C.

The analysis was as follows:

Calculated ($C_{22}H_{24}ClNO_6$) (percent): carbon, 60.9; hydrogen, 5.6; nitrogen, 3.2; chlorine, 8.2. Found (percent): carbon 60.7; hydrogen, 5.6; nitrogen, 3.25; chlorine, 7.8.

The ultraviolet data were as follows:

$\lambda_{max.}^{EtOH}$ 325 m$\mu$ ($\epsilon$=25,400)

EXAMPLE 9

4.97 parts of acryloyl chloride in 50 parts of dry benzene were added with stirring to 13 parts N,N'-[di(1,3 diphenyl prop-1-en-2-yl)] piperazine in 100 parts of dry benzene at the boil over a period of 90 minutes. The product formed as a pink solid, changing slowly to a fawn solid. The suspension was refluxed for 24 hours and then cooled and the solid filtered off. The solid was suspended in water and sodium bicarbonate solution added until pH 8. The product was then filtered off and when recrystallised from dimethylsulphoxide, 13 parts of N,N'-(2,4 diphenylcyclohex-2-ene-1-one-3-yl) piperazine as pale yellow needles having a melting point of 300–1° C. were obtained. The yield was 41% and the analysis was as follows:

Calculated ($C_{40}H_{38}N_2O_2$) (percent): carbon, 83.0; hydrogen, 6.6; nitrogen, 4.8. Found (percent): carbon, 82.6; hydrogen, 6.8; nitrogen, 4.9.

The ultra-violet data were as follows:

$\lambda_{max.}$ (chloroform) 331 m$\mu$ ($\epsilon$=38,200)

EXAMPLE 10

0.96 part of acryloyl chloride in 25 parts of dry benzene was added with stirring to 3.15 parts of 1-morpholinocyclopentadecene in 75 parts of dry benzene at the boil over 30 minutes. The mixture was refluxed for 20 hours, cooled to room temperature and solid product collected. The solid was dissolved in water and 2 N sodium hydroxide added until pH 9. The resultant mixture was ether extracted to give 2.7 parts of 18-N-morpholino-$\Delta^{14,18}$-bicyclo (12,3,1) octadecan-15-one as pale cream needles having a melting point of 77° when crystallised from petrol/benzene. The yield was 74.5% and the analysis was as follows:

Calculated ($C_{22}H_{37}NO_2$)(percent): carbon, 76.0; hydrogen, 10.7; nitrogen, 4.0. Found (percent): carbon, 75.7; hydrogen, 10.5; nitrogen, 3.95.

The ultra-violet data were as follows:

$\lambda_{max.}$ 338 m$\mu$ ($\epsilon$=19,900)

EXAMPLE 11

0.5 part of 2,4-diphenyl 3-N-morpholino cyclohex-2-en-1-one was added to 100 parts of acetyl cellulose and the mixture was ground very finely and compressed into a disc.

The resultant compound was found to have improved stability to ultra-violet light.

We claim:

1. 2,4-diphenyl-3-morpholinocyclohex-2-en-1-one.
2. 2,4-diphenyl-6-methyl-3-morpholinocyclohex-2-en-1-one.
3. A compound having the formula

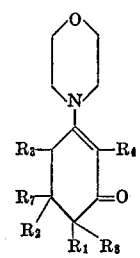

wherein
$R_1$, $R_2$, $R_7$ and $R_8$ are independently hydrogen or straight chain alkyl from 1 to 5 carbon atoms, provided that at least one of $R_1$ and $R_7$ is hydrogen, and $R_3$ and $R_4$ are phenyl.

References Cited

Hargreaves et al.: Chemical Abstracts, vol. 70, p. 3331q (1969), abstracting from J. Chem. Soc. (1968).

ALEX MAZEL, Primary Examiner

J. TOVAR, Assistant Examiner

U.S. Cl. X.R.

106—176, 186; 260—268 R, 326.5 U, 570.5 CA